US010616734B1

(12) United States Patent
Lekutai

(10) Patent No.: US 10,616,734 B1
(45) Date of Patent: Apr. 7, 2020

(54) UNMANNED AERIAL VEHICLE ASSISTED V2X

(71) Applicant: T-Mobile USA, Inc., Bellevue, WA (US)

(72) Inventor: Gaviphat Lekutai, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/196,984

(22) Filed: Nov. 20, 2018

(51) Int. Cl.
| | |
|---|---|
| *G08G 1/16* | (2006.01) |
| *H04W 4/46* | (2018.01) |
| *H04W 4/44* | (2018.01) |
| *G08G 5/00* | (2006.01) |
| *G08G 1/0965* | (2006.01) |
| *G08G 1/052* | (2006.01) |
| *H04W 4/02* | (2018.01) |

(52) U.S. Cl.
CPC .............. *H04W 4/46* (2018.02); *G08G 1/052* (2013.01); *G08G 1/0965* (2013.01); *G08G 1/162* (2013.01); *G08G 5/0078* (2013.01); *H04W 4/027* (2013.01); *H04W 4/44* (2018.02)

(58) Field of Classification Search
CPC ......... H04W 4/44; H04W 4/46; H04W 4/027; G08G 1/052; G08G 1/0965; G08G 1/162; G08G 5/0078; G06F 3/0481; G06F 3/04842

USPC ............ 340/435, 436, 903, 905, 931, 932.2; 455/418, 420, 421, 425, 431, 433
See application file for complete search history.

(56) References Cited

U.S. PATENT DOCUMENTS

| | | | |
|---|---|---|---|
| 9,355,423 B1* | 5/2016 | Slusar | G06Q 40/08 |
| 2017/0142766 A1* | 5/2017 | Kim | H04W 48/20 |
| 2018/0003965 A1* | 1/2018 | O'Toole | G08G 1/167 |
| 2018/0144634 A1* | 5/2018 | Kim | G08G 1/096775 |
| 2019/0079659 A1* | 3/2019 | Adenwala | G06F 3/04842 |
| 2019/0208387 A1* | 7/2019 | Jiang | H04W 4/46 |

* cited by examiner

*Primary Examiner* — Hung T Nguyen
(74) *Attorney, Agent, or Firm* — Han Santos, PLLC

(57) ABSTRACT

Techniques are described herein for conducting traffic and road operations using unmanned aerial vehicle (UAV) assisted vehicle-to-everything (V2X) communications. The UAVs can be deployed at various locations and can be operatively connected to a cell site, a mobile edge computing (MEC) server, and/or a V2X sensor. The UAVs, upon detecting an oncoming vehicle from a target location traveling towards one or more autonomous vehicles (AVs), can directly communicate with the one or more AVs to alert the AVs of the approaching oncoming vehicle. If the UAVs cannot communicate with the AVs, the UAVs can handover messages to other UAVs that can communicate with the AVs. The UAVs can also transport messages to a cell site and/or a V2X sensor to broadcast messages to the one or more AVs. Cell sites can also transmit messages to broadcast the messages to the AVs within respective coverage areas.

20 Claims, 6 Drawing Sheets

UNMANNED AERIAL VEHICLE ASSISTED V2X

BACKGROUND

Vehicle communication systems can comprise vehicle-to-everything (V2X) communication software or programs that can be used to facilitate transmission of information from a vehicle to any entity that may affect the vehicle and vice versa. V2X software generally resides at least partially in a memory unit of a vehicle's computing system and enables the vehicle to act as a communication node when communicating with various entities. For example, vehicles can communicate with other vehicles, infrastructures (e.g., traffic lights), pedestrians with mobile devices, networks, and/or so forth. Thus, V2X can include components such as vehicle-to-vehicle (V2V), vehicle-to-infrastructure (V21), vehicle-to-pedestrian (V2P), and vehicle-to-network (V2N) communications.

V2X can be used for road safety and traffic efficiency purposes. For instance, V2X can be implemented to provide forward collision warning, lane change warning, emergency electric brake light warning, roadworks warning, and/or so forth. In this way, V2X can be applied in autonomous driving. V2X communication can be a wireless local area network (WLAN) based system or a cellular-based system. While cellular based V2X can provide a higher percentage of successful data packet delivery and communication range than WLAN based V2X, a vehicle must still be within a communication range of a target entity to enable successful passing of information or data packet delivery in V2X communication. In this regard, V2X communication may be applied only in limited scenarios where vehicles are located in the communication range.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
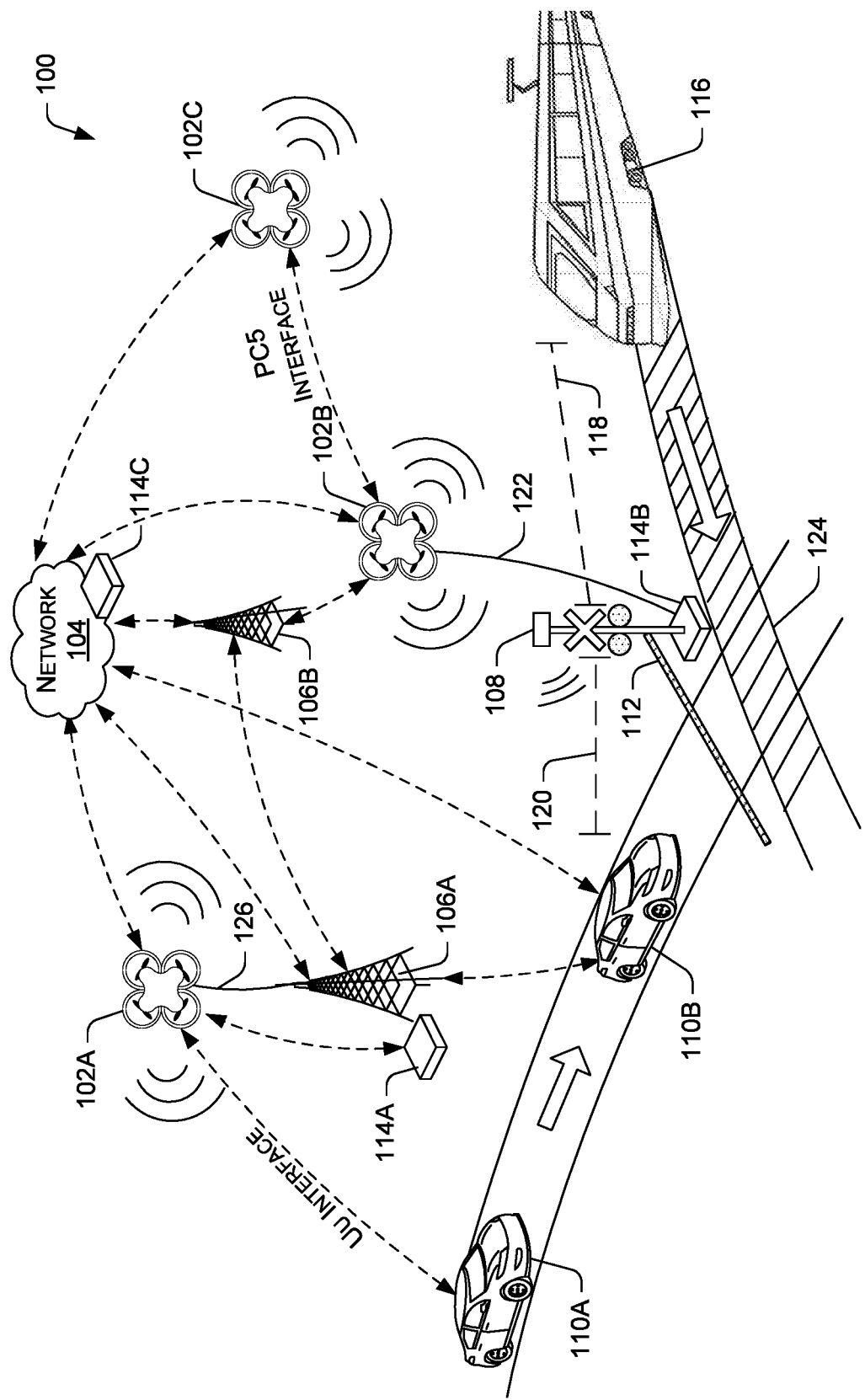
FIG. 1 illustrates example network architecture for implementing unmanned aerial vehicles (UAVs) to assist V2X communications in traffic and road operations.

This disclosure is directed to techniques for implementing unmanned aerial vehicles (UAVs) to assist V2X communications in traffic and road operations. In various embodiments, a plurality of UAVs is deployed in various areas, preferably near public infrastructure. The UAVs are equipped with various sensors and communication interfaces for monitoring traffic and detecting oncoming vehicles. One or more UAVs can be operatively connected to a cell site that can communicate with autonomous vehicles (AVs) or connected vehicles (CVs) having the V2X capability within its communication range. V2X can be implemented in order to transmit and receive information relating to driving properties of the AVs and other nearby vehicles. V2X can include cellular vehicle-to-everything (C-V2X) and/or dedicated short-range communications (DSRC). C-V2X and/or DSRC can be combined with other technologies such as global position system (GPS), visual light communications (VLC), cellular communications (GPRS, 3G, LTE, etc.), Light Detection and Ranging (LIDAR), camera, and short-range radar, allowing vehicles to communicate their position, speed or velocity, heading, relative position to other objects and to exchange information with other vehicles or external computer systems. C-V2X and/or DSRC can be integrated with various systems such as mobile phones.

Upon detecting one or more road conditions, a UAV can transmit a message to the cell site to broadcast to AVs/CVs within the cell site's communication range. If the AVs/CVs are not within the cell site's communication range, the cell site can handover the message to another cell site to broadcast the messages to the AVs/CVs within its communication range. In various embodiments, one or more road conditions can include real-time traffic, accidents, weather conditions, speeds, travel times, road closures and restrictions, road work, and/or so forth. Based at least partially on the road conditions, the message can include alerts, warnings, and notifications such as forward collision warning, lane change warning, emergency electric brake light warning, roadworks warning, and/or so forth. In various embodiments, the AVs/CVs can control its acceleration and braking systems based on the message received from the cell site.

Additionally, or alternatively, one or more UAVs can be operatively connected to V2X sensors. The V2X sensors can be mounted on infrastructures such as traffic lights or road signs. Upon detecting one or more road conditions, a UAV can broadcast messages to a V2X sensor, which can communicate with AVs/CVs within its communication range. If the V2X sensor is not within the UAV's communication range, the UAV can transmit the messages to another UAV that is closer to the V2X sensor. In various embodiments, the UAVs can communicate directly with AVs/CVs. If an AV/CV is not within a UAV's communication range, the UAV can transmit messages to another UAV located closer to the AV/CV. It is noted that AVs/CVs can also communicate with other AVs/CVs using V2V communications. In this way, a first AV/CV that receives a message from a UAV or a V2X sensor can pass the message to a second AV/CV located in its vicinity.

In various embodiments, UAVs can be operatively connected to a mobile edge computing (MEC) server. The MEC server is configured to monitor road traffic using traffic data collected from the UAVs and/or other traffic databases. Traffic databases can include traffic monitoring stations, crowdsourced traffic data sources, traffic management systems, traffic operations centers, and/or so forth. Traffic data can include traffic volume data and statistics over a time period, public transportation routes and schedules, real-time or near real-time road conditions, and/or so forth.

Based at least partially on the traffic data collected, the MEC server can generate recommendations to facilitate the flow of traffic while minimizing inconvenience to travelers and maximizing roadway safety for all vehicles and pedestrians. The MEC server can transmit a message comprising the recommendations and relevant data to one or more UAVs, V2X sensors, other MECs, and/or cell sites. The MEC server can physically be located near cell sites and/or data centers. In various embodiments, the MEC server can serve virtually in the network clouds. The techniques described herein may be implemented in a number of ways. Example implementations are provided below with reference to the following figures.

Example Network Architecture

FIG. 1 illustrates an example architecture 100 for implementing unmanned aerial vehicles (UAVs) to assist vehicle-to-everything communications (V2X) in traffic and road operations. The architecture 100 includes one or more UAVs 102A-102C, which may comprise of drones. Accordingly, it is noted that references to one UAV as used in this application and the appended claims should generally be construed to mean one or more or at least one UAV unless specified otherwise or clear from context to be directed to a singular form. The UAV 102A-102C can be equipped with a network enabled device for connecting to a network 104 and can include flight control units and payload units. For example, the flight control units can include any appropriate avionics, control actuators, and/or other equipment such as motors, engines, and/or propellers to fly the UAV 102A-102C. Without limitation, the control actuators (e.g., digital electronic speed controllers) can be operatively connected to the UAV's computing unit that is configured to interface with its sensors, communication interface (e.g., transceivers), and power source (e.g., lithium-polymer batteries). Additionally, the UAV 102A-102C can include other vehicular devices, such as an unmanned vehicular device, a robotic device, and/or so forth, depending upon embodiments.

The computing unit can utilize various computing technologies such as a microcontroller, system-on-a-chip (SOC), and single-board computers (SBC). Alternatively, the computing unit can utilize a microprocessor and/or digital signal processor (DSP) with associated storage memory for executing computer instructions, controlling, and processing data. The instructions can comprise a UAV software such as flight stack or autopilot. The sensors can comprise various types of sensors for determining the state (e.g., position and movement) of the UAV 102A-102C. For instance, the sensors can comprise cameras, accelerometers, magnetic sensors, current sensors, tilt sensors, GPS, and/or so forth.

In various embodiments, the UAV 102A-102C can communicate with a control station (not pictured) via one or more transceivers, wherein the control station can be operated by a telecommunications service provider or a third party working with the telecommunications service provider. It is noted that the term "communicate" including variances thereof, as used herein, encompasses direct communication and indirect communication through one or more intermediary components and does not require direct physical communication and/or constant communication, but rather includes selective communication at periodic or aperiodic intervals, as well as one-time events. The control station can instruct each UAV 102A-102C to deploy to a target location to ensure coverage while minimizing overlapping. Additionally, the control station can monitor the status of the UAV 102A-102C to recall any defective UAVs.

The UAV 102A-102C can also be operatively connected to a MEC server 114A-114B. The MEC server 114A-114B can be deployed at a cell site 106A-106B (e.g., macro base station eNodeB in E-UTRAN), the Radio Network Controller (RNC), or any other common wireless or wireline network access technologies that are part of the network 104. Additionally, or alternatively, the MEC server 114A-114B can be deployed at other facilities or infrastructures (e.g., traffic lights, road signs). The network 104 can be a cellular network that implements 2G, 3G, 4G, 5G including their variants such as new radio (NR), long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks. In this regard, the cell site 106A-106B can be a multi-technology cell aggregation site that can be located indoors or outdoors.

The MEC server 114A-114B can provide computing resources, storage capacity, connectivity, and access to RAN information. For instance, the MEC server 114A-114B is further configured to provide a cache for receiving and caching data. The MEC server 114A-114B may also store data in a distributed storage system, in which data may be stored for long periods of time and replicated to guarantee reliability. Accordingly, the MEC server 114A-114B may provide a distributed computing environment for application and service hosting. For instance, the MEC server 114A-114B may provide data and processing redundancy, in which data processing and data storage may be scaled in response to the demand to offload data and/or computational load as needed. In this regard, the MEC server 114A-114B can include a plurality of physical machines that may be grouped together and presented as a single computing system. Each physical machine of the plurality of physical machines may comprise a node in a cluster. The MEC server 114A-114B may also be in the form of virtual machines, such as virtual engines (VE) and virtual private servers (VPS). Thus, the MEC server 114C can serve virtually in the network clouds.

The MEC server 114A-114B can support a multitenancy run-time and hosting environment for applications. The virtual appliance applications are delivered as packaged operating system virtual machine (VM) images. The MEC platform also provides a set of middleware application and infrastructure services. Application software can be provided from equipment vendors (e.g., original equipment manufacturers (OEMs)), telecommunications service providers, and/or third parties working with the equipment vendors and/or telecommunications service providers. Generally, the MEC server 114A-114B may be operated by a telecommunications service provider or a third-party entity that is working with the telecommunications service provider.

While the illustrated embodiment includes MEC servers 114A-114B, other embodiments can include other types of servers that may include general-purpose computers, such as desktop computers, tablet computers, laptop computers, servers (e.g., on-premise servers), or other electronic devices that are capable of receiving inputs, processing the inputs, and generating output data. Additionally, the MEC servers 114A-114B and/or other types of servers can be located at the core network, namely network 104.

The MEC servers 114A-114B can wirelessly communicate with one or more UAVs 102A-102C. In various embodiments, at least one UAV 102B can be physically tethered to at least one MEC server 114B via a cable transport or a wired transport 122. For instance, the UAV 102B can be physically connected to the MEC server 114B via coaxial cable, fiber, Ethernet, or any combination thereof. The wired transport 122 can be used to facilitate both signaling and data communication as well as to provide power to the UAV 102B.

The UAVs 102A-102C can also communicate with one or more autonomous vehicles (AV) 110A-110B equipped with V2X and self-driving technology. The AVs 110A-110B can comprise a standard gasoline powered vehicle, a hybrid vehicle, an electric vehicle, a fuel cell vehicle, or any other type of suitable vehicle. Each AV 110A-110B can include standard features such a dashboard operatively connected to the AV's computing system, seats, batteries, an engine or motor, a transmission, an HVAC system including a compressor and electronic expansion valve, a windshield, doors, windows, seatbelts, airbags, a steering wheel, tires, and/or so forth. Additionally, each AV 110A-110B can include a variety of sensors to perceive its surroundings, such as radar, computer vision, lidar, sonar, GPS, odometry and inertial measurement units. Accordingly, various vehicle features as described herein can be configured to mechanically move the AV 110A-110B using steering, acceleration, and deceleration. The AV's 110A-110B computing system can include a memory unit that is operatively connected to a processor. The memory unit comprises V2X software that can be executed by the processor to enable the AV 110A-110B to communicate with one or more entities, thereby enabling the AV 110A-110B to act as a communication node when communicating with various entities.

The UAVs 102A-102C can also communicate with one or more V2X sensors 108. The V2X sensors 108 can be removably attached to infrastructure 112 such as traffic lights or road signs. In the illustrated embodiment, the V2X sensor 108 is mounted on a railroad (R&R) crossing signage and/or R&R crossing gate at a level crossing 124. Additionally, or alternatively, the V2X sensors 108 can be permanently affixed or integral to infrastructure 112. The V2X sensors 108 can comprise visual and position sensors such as an electromagnetic radar type sensor, a laser radar type sensor, or a pulsed infrared laser type sensor, as well as higher-resolution cameras. In this way, the V2X sensors 108 can be used to identify vehicles, types of vehicles, or communicate with vehicles, for example, via a device, such as a vehicle key or a mobile phone that is personal to the vehicle's driver or passenger.

In various embodiments, the UAVs 102A-102C can communicate with one or more V2X sensors 108 to deliver a message to the AVs 110A-110B. In this regard, a UAV 102C can patrol and/or monitor a target location to detect one or more road conditions. In various embodiments, one or more road conditions can include real-time traffic, accidents, weather conditions, speeds, travel times, road closures and restrictions, road work, and/or so forth. Upon identifying the one or more road conditions, the UAV 102C can broadcast a generated message to the V2X sensor 108 to communicate to the AV 110B within the V2X sensor's 108 communication range. In this regard, the UAV 102C may be configured to create and generate a message or obtain a generated message from one or more MEC servers 114-11B. The message can be instructional and/or informational. For instance, instructional messages can include alerts, warnings, and notifications such as forward collision warning, lane change warning, blind spot warning, emergency electric brake light warning, roadworks warning, intersection movement assistance, left turn assistance, and/or so forth. Informational messages can include speed advisories, lane change warnings, surrounding vehicles and pedestrian identification, and/or so forth.

For example, upon detecting a moving train 116 at a first location traveling towards the V2X sensor 108 near a level crossing 124 at a second location, the first UAV 102C at the first location can generate a message comprising speed advisories to slow down or stop at the level crossing 124. The first UAV 102C can transmit the message directly to the V2X sensor 108. If the V2X sensor 108 is not within the first UAV's 102C communication range, the UAV 102C can transmit the message to the second UAV 102B at the second location via an LTE-V2X (PC5) interface or other radio interfaces. The PC5 interface includes a packet data convergence protocol (PDCP) layer, radio link control (RLC) layer, medium access control (MAC) layer, and a physical (PHY) layer. The second UAV 102B at the second location can broadcast the message to the V2X sensor 108 at the level crossing 124.

The V2X sensor 108 can communicate with AVs 110A-110B and share the message via a UMTS air interface (Uu interface) or other radio interfaces such as internet of things (IoT). In this way, the AV 110B can prepare to stop at the level crossing 124 in a timely manner to avoid a collision with the train 116. Similarly, one or more UAVs 102A-102C and/or V2X sensor 108 can communicate with a second train traveling in another direction to provide warnings, notifications, or alerts. In various embodiments, the message can also include the speed or velocity of the train 116, the approximate distance 118 between the train 116 and the level crossing 124, the train's 116 direction of travel or destination, time to cross the level crossing 124 or stop at the level crossing 124 based at least partially on the train's 116 speed and the distance 118 relative to the AV's 110B speed and the distance 120 between the AV 110B and the level crossing 124, and/or so forth.

In another example, UAVs 102A-102C can communicate with one or more cell sites 106A-106B to deliver a message to AVs 110A-110B. In this regard, UAVs 102A-102C can monitor a target location to detect one or more road conditions. For instance, the UAV 102A can detect a moving train 116 at a first location. The UAV 102A at the first location can be connected to a first cell site 106A via a wired transport 126 or a cable transport. The wired transport 126 can be used to facilitate signaling and data communication. Additional wired transport 126 can be implemented to provide power to the UAV 102A. While the wired transport 126 physically secures the UAV 102A to the first cell site 106A, the wired transport 126 provides enough slack to enable the UAV 102A to fly within a limited range. The first cell site 106A can share the message to the AV 110B through normal cellular communication. If the AV 110B is outside of the coverage area of the first cell site 106A, the first cell site 106A can handover the message to a second cell site 106B to deliver the message to the AV 110B via the Uu interface or other radio interface if the AV 110B is within the second cell site's communication range.

Additionally, or alternatively, the first UAV 102A can relay the message to the second UAV 102B at the second location. The second UAV 102B can be operatively connected to the second cell site 106B. The second UAV 102B can transport the message down to the second cell site 106B via wired communication (e.g., coax, Ethernet, fiber, etc.) or wireless communication. Thereafter, the second cell site 106B can deliver the message to the AV 110B via the Uu interface or other radio interfaces if the AV 110B is within the second cell site's 106B communication range. Upon receiving the message, the AV 110B can communicate with another AV 110A via V2V communication if the AV 110B is within the second cell site's 106B communication range but the AV 110A is not within the second cell site's 106B communication range.

Example Computing Device Components

Figure 2:
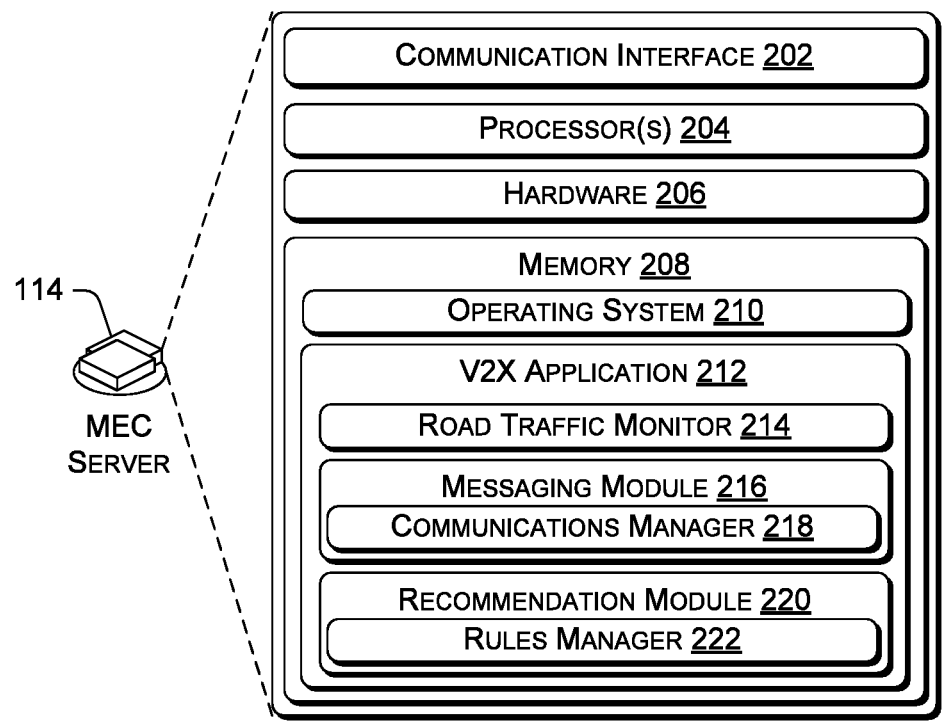
FIG. 2 is a block diagram showing various components of an illustrative computing device that implements V2X communications in traffic and road operations.

FIG. 2 is a block diagram showing various components of an illustrative computing device, wherein the computing device can comprise a MEC server 114. It is noted that the MEC server 114 as described herein can operate with more or fewer of the components shown herein. Additionally, the MEC server 114 as shown herein or portions thereof can serve as a representation of one or more of the computing devices of the present system.

The MEC server 114 may include a communication interface 202, one or more processors 204, hardware 206, and memory 208. The communication interface 202 may include wireless and/or wired communication components that enable the MEC server 114 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the MEC server 114.

The processors 204 and the memory 208 of the MEC server 114 may implement an operating system 210 and a V2X application 212. The operating system 210 may include components that enable the MEC server 114 to receive and transmit data via various interfaces (e.g., user controls, a communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The V2X application 212 is configured to facilitate traffic and road operations. In various embodiments, the V2X application 212 comprises a road traffic monitor 214, a messaging module 216, and a recommendation module 220. The road traffic monitor 214 is configured to receive traffic data and/or information pertaining to road conditions from the UAVs and/or various traffic databases such as traffic monitoring stations, crowdsourced traffic data sources, traffic management systems, traffic operations centers, and/or so forth. Traffic data can include traffic volume data and statistics over a time period, public transportation routes and schedules, real-time or near real-time road conditions, and/or so forth. In various embodiments, the road traffic monitor 214 can include a data management layer to facilitate the acquisition, processing, storage, and analysis of traffic data from the UAVs and the various traffic databases. The data management layer can provide an application program interface (API) to access the data in the databases. The data management layer can also include multiple data adaptors to obtain multiple types of data from the databases and implement a scheduling scheme to obtain the traffic data on a scheduled basis.

The traffic data can be provided to the recommendation module 220. The recommendation module 220, based at least partially on the traffic data and/or road conditions, may generate a recommendation for road or traffic operations. The recommendation can include recommended alternative routes, recommended speed limits, recommended travel departure and/or arrival times, and/or so forth. In various embodiments, the recommendation module 220 can implement machine learning in order to generate recommendations. The recommendation module 220 can also include a rules manager 222 for managing one or more predetermined parameters related to road or traffic operations. For instance, the one or more predetermined parameters can include road closures, drawbridge operation hours, marine traffic, railroad traffic, and/or so forth. In this regard, the recommendation module 220 can also generate recommendations based at least partially on the one or more predetermined parameters. For instance, if the parameters include scheduled road closures, the recommendation module 220 can exclude roads that are closed when recommending alternate routes during the scheduled closure times.

The recommendation module 220 can provide the generated recommendations to the messaging module 216. The messaging module 216 is configured to create or generate messages based at least partially on the recommendations, wherein the messages can be communicated to one or more AVs. The messages can be instructional and/or informational. Instructional messages include alerts, warnings, and notifications such as forward collision warning, lane change warning, blind spot warning, emergency electric brake light warning, roadworks warning, intersection movement assistance, left turn assistance, and/or so forth. Additionally, informational messages can include speed advisories, lane change warnings, proximity alerts, and/or so forth. In various embodiments, AVs, upon receiving instructional and/or informational messages, can control its acceleration and braking systems.

In various embodiments, the message can also include information related to one or more vehicles affecting traffic or road operations. For example, the one or more vehicles can include a train. More particularly, upon receiving a message from a UAV indicating a presence of a train at a first location, the road traffic monitor 214 can obtain information relating to the train such as the speed of the train, the approximate distance between the train and the nearest level crossing at a second location, the train's direction of travel or destination, and/or so forth. Based at least partially on the train's speed and the distance relative to an AV's speed and the distance between the AV and the level crossing, the recommendation module 220 can determine the AV's time to cross the level crossing or stop at the level crossing, and/or so forth. Additionally, the recommendation module 220 can provide speed advisories and other recommendations in the message to the AV.

The messaging module 216 includes a communications manager 218. The communication manager 218 can facilitate communication between the MEC server 114 and a plurality of UAVs and/or cell sites. More specifically, the communication manager 218 can collect messages, distribute messages to the correct entities, store messages, retrieve messages, and/or so forth. For example, the communication manager 218 can distribute or transmit messages to specific UAVs and/or cell sites. Additionally, the communication manager 218 can communicate with datastores to store messages for short or long periods of time.

Example Processes

FIGS. 3 through 6 present illustrative processes 300-600 for performing traffic and road operations using various combinations of UAVs, V2X sensors, and cell sites. The processes 300-600 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-600 are described with reference to the architecture 100 of FIG. 1.

Figure 3:
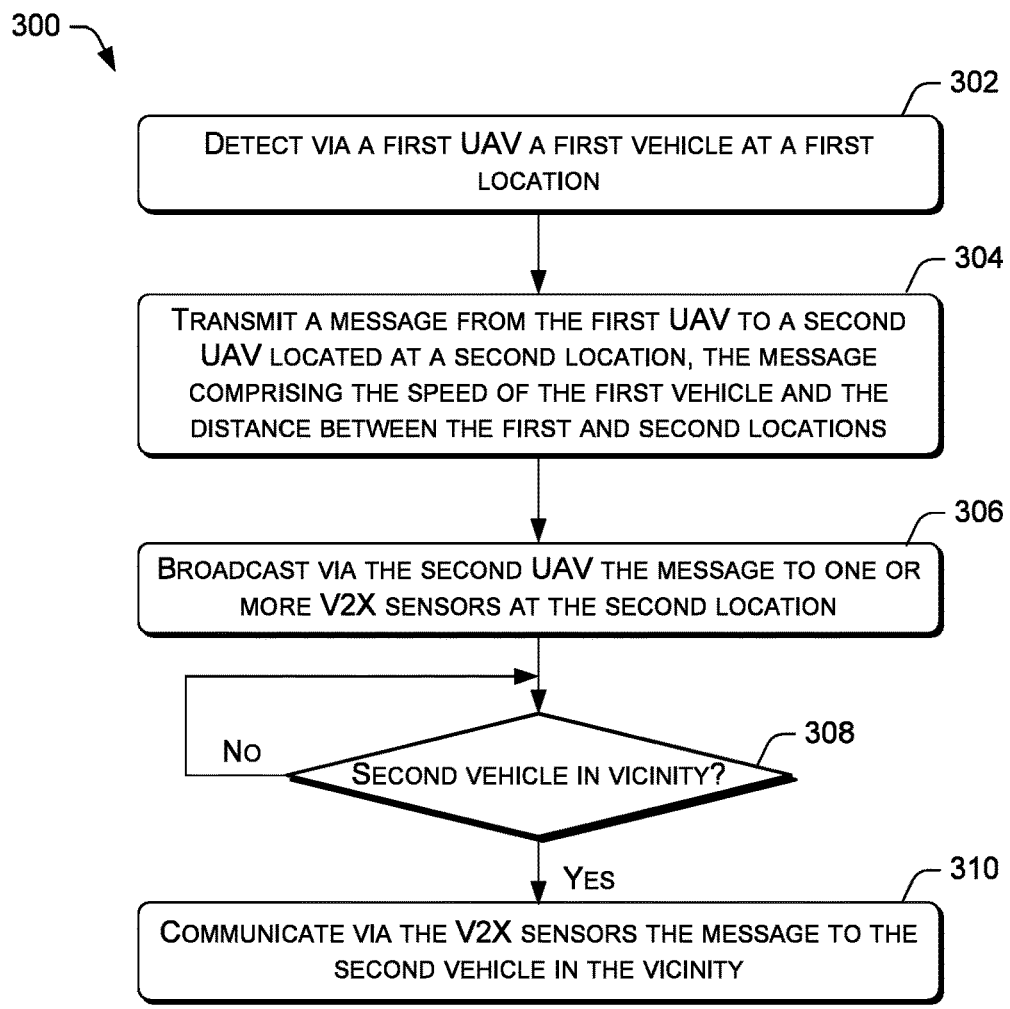
FIG. 3 is a flow diagram of an example process for utilizing UAVs and V2X sensors to conduct traffic and road operations.

FIG. 3 is a flow diagram of an example process 300 for utilizing UAVs and V2X sensors to conduct traffic and road operations. At block 302, a first UAV detects a first vehicle at a first location, the first vehicle traveling towards a second location. At block 304, the first UAV transmits a message to a second UAV located at the second location. The message can include information about the first vehicle. For example, the message can comprise the speed of the first vehicle and the distance between the first location and the second location. Additionally, the message can comprise the direction of travel, the type of the vehicle, and/or so forth. At block 306, the second UAV broadcasts the message to one or more V2X sensors at the second location.

At decision block 308, the V2X sensors can detect and determine whether a second vehicle is in the vicinity. In a non-limiting example, the first vehicle can be a train and the second vehicle can be an AV. If the second vehicle is in the vicinity ("yes" response from the decision block 308), the V2X sensors can communicate the message to the second vehicle, as indicated in block 310. If the second vehicle is not in the vicinity or within a predetermined distance from the V2X sensors ("no" response from the decision block 308), the V2X continues monitoring the location for vehicles, such as the second vehicle, that are within the vicinity of the V2X sensors.

Figure 4:
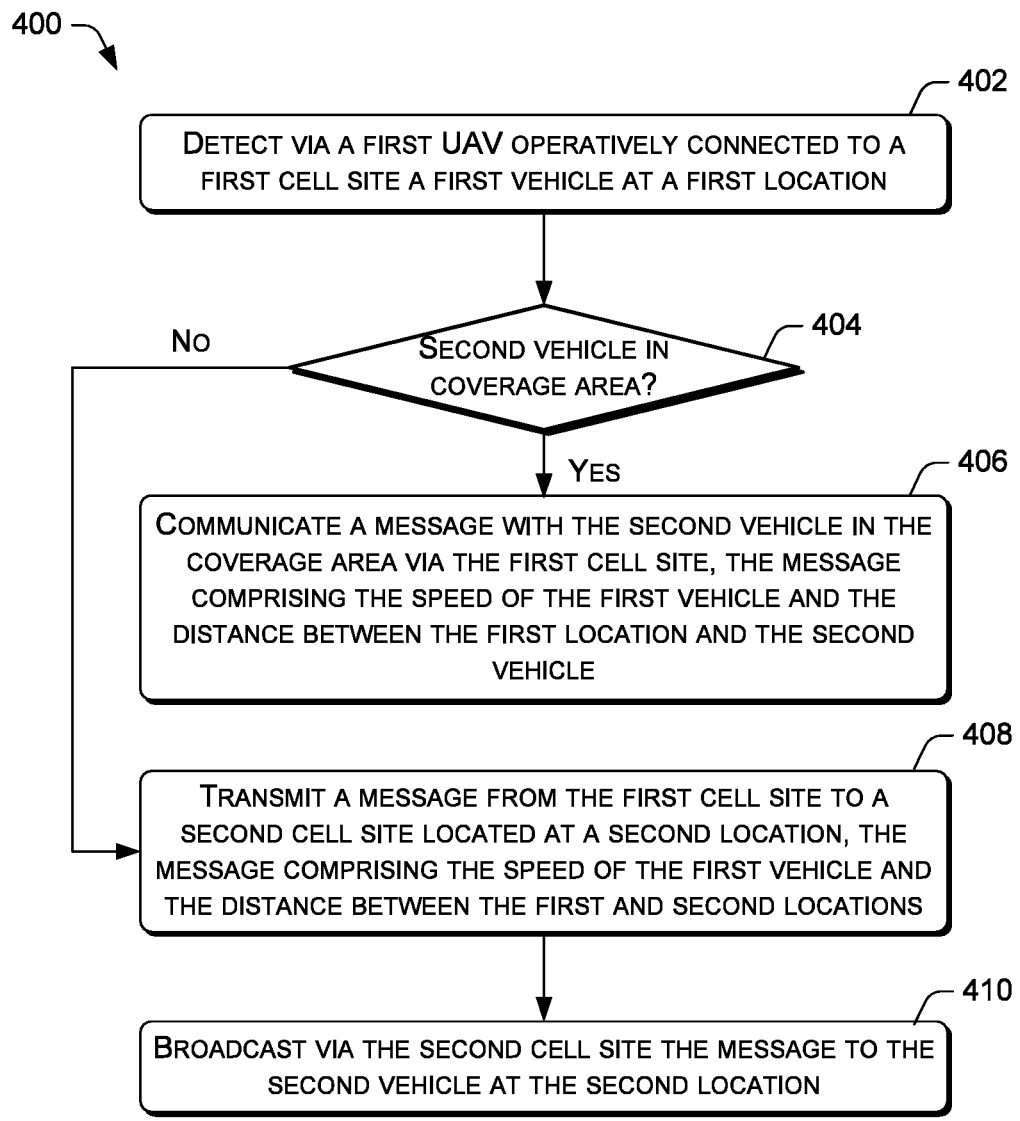
FIG. 4 is a flow diagram of an example process for utilizing UAVs and cell sites to conduct traffic and road operations.

FIG. 4 is a flow diagram of an example process 400 for utilizing UAVs and cell sites to conduct traffic and road operations. At block 402, a first UAV detects a first vehicle at a first location, the first vehicle traveling towards a second location. The first UAV is operatively connected to a first cell site. At decision block 404, the first UAV determines whether a second vehicle is in the first cell site's coverage area. If the second vehicle is in the coverage area ("yes" response from the decision block 404), the first cell site communicates a message with the second vehicle in the coverage area, as indicated in block 406. The message can be instructional and/or informational. For instance, the message can comprise the speed of the first vehicle and the distance between the first location and the second vehicle or a target location such as the second location. In various embodiments, the second location comprises various landmarks or infrastructure such as an intersection, a level crossing, traffic lights, and/or so forth. Based on the information, the message can also include recommendations for road operations, such as a recommended alternate route.

If the second vehicle is not in the coverage area ("no" response from the decision block 404), the first cell site transmits a message to a second cell site located at the second location, as indicated in block 408. The message can comprise the speed of the first vehicle and the distance between the first location and the second location. At block 410, the second cell site broadcasts the message to the second vehicle at the second location.

Figure 5:
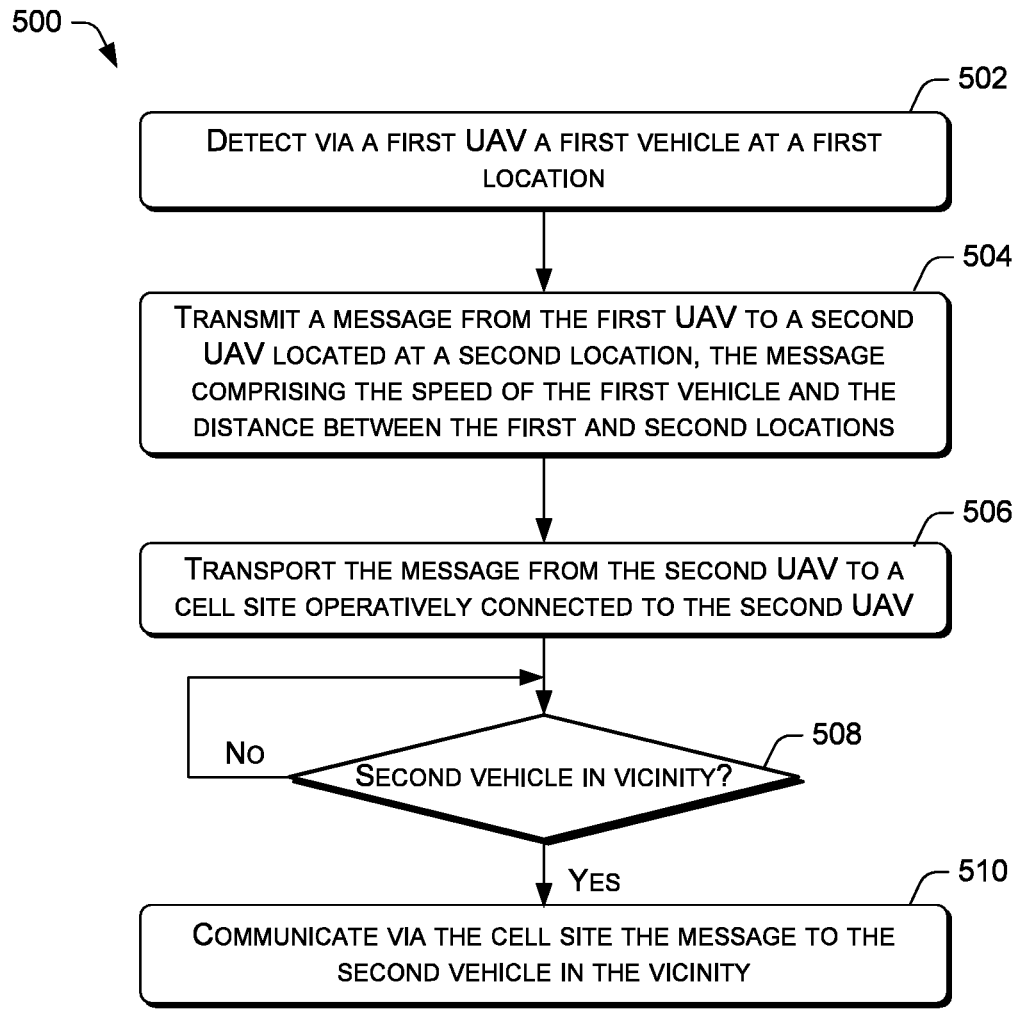
FIG. 5 is another flow diagram of an example process for utilizing UAVs and cell sites to conduct traffic and road operations.

FIG. 5 is another flow diagram of an example process 500 for utilizing UAVs and cell sites to conduct traffic and road operations. At block 502, a first UAV detects a first vehicle at a first location, the first vehicle traveling towards a second location. At block 504, the first UAV transmits a message to a second UAV located at the second location. The message can comprise various traffic data and/or information related to one or more vehicles such as the speed of the first vehicle and the distance between the first location and the second location. Additionally, the message can comprise the direction of travel, the type of the vehicle, and/or so forth. In this way, the message includes information that would enable an AV to make one or more driving decisions. At block 506, the second UAV transports the message to a cell site operatively connected to the second UAV at the second location.

At decision block 508, the cell site determines whether a second vehicle is in the vicinity or within its coverage area. If the second vehicle is in the vicinity ("yes" response from the decision block 508), the cell site can communicate the message to the second vehicle, as indicated in block 510. If the second vehicle is not in the vicinity or within a predetermined distance from the cell site ("no" response from the decision block 508), the cell site continues to attempt to communicate the message to the second vehicle until the second vehicle is in the vicinity.

Figure 6:
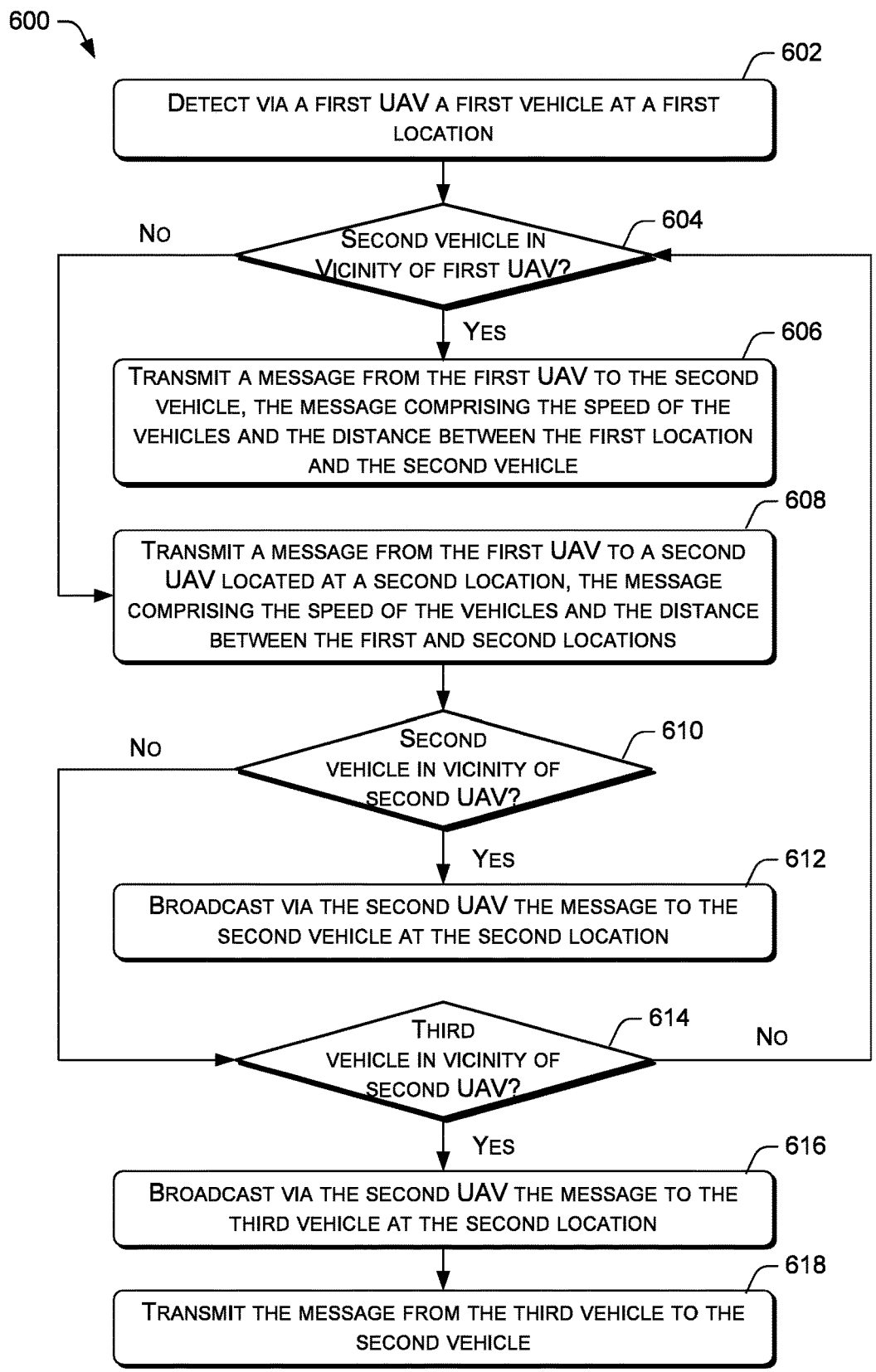
FIG. 6 is a flow diagram of an example process for utilizing a fleet of UAVs to conduct traffic and road operations.

FIG. 6 is a flow diagram of an example process for utilizing a fleet of UAVs to conduct traffic and road operations. At block 602, a first UAV detects a first vehicle at a first location, the first vehicle traveling towards a second location. At decision block 604, the first UAV determines whether a second vehicle is in the vicinity. If the second vehicle is in the vicinity ("yes" response from the decision block 604), the first UAV transmits a message to the second vehicle, as indicated in block 606. The message can include the speed of the first vehicle and the second vehicle, and the distance between the first location and the second vehicle or a target location such as the second location. If the second vehicle is not in the vicinity ("no" response from the decision block 604), the first UAV transmits a message to a second UAV located at a second location, as indicated in block 608. The message can include the speed of the first vehicle and the second vehicle and the distance between the first location and the second location.

At decision block 610, the second UAV determines whether the second vehicle is in the vicinity. If the second vehicle is in the vicinity of the second UAV ("yes" response from the decision block 610), the second UAV broadcasts the message to the second vehicle at the second location, as indicated in block 612. If the second vehicle is not in the vicinity of the second UAV ("no" response from the decision block 610, the second UAV determines whether a third vehicle is in the vicinity, as indicated in decision block 614. If the third vehicle is in the vicinity of the second UAV ("yes" response from the decision block 614), the second UAV broadcasts the message to the third vehicle at or near the second location, as indicated in block 616.

At block 618, the third vehicle transmits the message to the second vehicle using V2V communication. If the third vehicle is not in the vicinity of the second UAV ("no" response from the decision block 614), the first UAV determines whether the second vehicle is in its vicinity, as indicated in the decision block 604. This process continues until the second vehicle is in the vicinity of the first UAV, the second UAV, and/or the third vehicle.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of an unmanned aerial vehicle (UAV) storing computer-executable instructions that upon execution cause one or more processors to perform acts comprising:
   detecting a presence of a first vehicle at a first location, the first vehicle being non-vehicle-to-everything (non-V2X) capable and traveling towards a second location;
   generating a message to transmit to a second vehicle having a vehicle-to-everything (V2X) capability in vicinity of the second location, the message indicating that the first vehicle is traveling towards the second location; and
   if the second vehicle is not within a communication range of the UAV, broadcasting the message to a V2X sensor at the second location, wherein the V2X sensor is configured to relay the message to the second vehicle via a V2X communication protocol.

2. The one or more non-transitory computer-readable media of claim 1, wherein the message is transmitted via a cellular air interface.

3. The one or more non-transitory computer-readable media of claim 1, wherein the first vehicle is a train and the second vehicle is an autonomous vehicle (AV).

4. The one or more non-transitory computer-readable media of claim 1, wherein the V2X sensor is mounted to an infrastructure.

5. The one or more non-transitory computer-readable media of claim 1, wherein the UAV is operatively connected to a base station and the acts further comprise:
   transmitting the message to the base station upon determining that the second vehicle is not within an additional communication range of the V2X sensor, wherein the base station is configured to relay the message to the second vehicle.

6. The one or more non-transitory computer-readable media of claim 5, wherein the UAV is connected to the base station via a wired transport.

7. The one or more non-transitory computer-readable media of claim 1, wherein the acts further comprise:
   broadcasting the message to an additional UAV at the second location upon determining that the second vehicle is not within the communication range, wherein the additional UAV is configured to relay the message to the second vehicle.

8. The one or more non-transitory computer-readable media of claim 1, wherein the second vehicle is further configured to communicate the message to a third vehicle via a vehicle-to-vehicle (V2V) communication protocol.

9. The one or more non-transitory computer-readable media of claim 1, wherein the one or more non-transitory computer-readable media is operatively connected to a mobile edge computing (MEC) server.

10. A computer-implemented method, comprising:
    receiving a message from a UAV indicating a presence of a first vehicle at a first location, the first vehicle being non-vehicle-to-everything (non-V2X) capable and traveling towards a second location; and
    broadcasting the message indicating that the first vehicle is traveling towards the second location via a base station to a second vehicle near the second location and not in a communication range of the UAV, wherein the second vehicle has vehicle-to-everything (V2X) capability.

11. The computer-implemented method of claim 10, further comprising steps of:
    determining an amount of time for the first vehicle and the second vehicle to arrive at an intersection at the second location based at least on a first velocity of the first vehicle and a first distance between the first vehicle and the second location relative to a second velocity of the second vehicle and a second distance between the second vehicle and the intersection;
    generating a speed advisory for the second vehicle; and
    transmitting the speed advisory to the second vehicle.

12. The computer-implemented method of claim 10, further comprising steps of:
    transmitting the message to an additional base station upon determining the second vehicle is not within a communication range of the base station, wherein the additional base station is configured to broadcast the message to the second vehicle.

13. The computer-implemented method of claim 10, further comprising steps of:
    determining that the message is to be transmitted to a third vehicle that is not within a communication range of the base station, wherein the second vehicle is configured to transmit the message to the third vehicle via a vehicle-to-vehicle (V2V) communication protocol.

14. The computer-implemented method of claim 13, wherein the message is transmitted via an LTE-V2X (PC5) interface.

15. The computer-implemented method of claim 10, further comprising steps of:
   determining that the second vehicle is not within a communication range of the base station; and
   transmitting the message to a second UAV, wherein the second UAV is configured to communicate with the second vehicle via a cellular air interface.

16. The computer-implemented method of claim 10, further comprising steps of:
   transmitting the message to a V2X sensor at the second location if the second vehicle is not within a communication range of the base station, wherein the V2X sensor is configured to communicate with the second vehicle.

17. A system, comprising:
   one or more non-transitory storage mediums of an unmanned aerial vehicle (UAV) configured to provide stored computer-readable instructions, the one or more non-transitory storage mediums coupled to one or more processors, the one or more processors configured to execute the computer-readable instructions to cause the one or more processors to:
      detect a presence of a first vehicle at a first location, the first vehicle being non-vehicle-to-everything (non-V2X) capable and traveling towards a second location;
      generate a message to transmit to a second vehicle in vicinity of the second location, the message indicating that the first vehicle is traveling towards the second location, wherein the second vehicle has vehicle-to-everything (V2X) capability; and
      if the second vehicle is not within a communication range of the UAV, broadcasting the message to at least one entity connected to a server at the second location upon determining that the second vehicle is in a second communication range of the at least one entity.

18. The system of claim 17, wherein the at least one entity is a V2X sensor, a base station, or a second UAV.

19. The system of claim 17, wherein the message further comprises a forward collision warning, a lane change warning, blind spot warning, emergency electric brake light warning, roadworks warning, an intersection movement assistance, left turn assistance, speed advisories, lane change warnings, or proximity alerts.

20. The system of claim 17, wherein the server comprises a mobile edge computing (MEC) server.

* * * * *